April 30, 1963     E. A. WHEELOCK     3,087,733
OIL AND DIRT SEAL
Filed Feb. 17, 1959
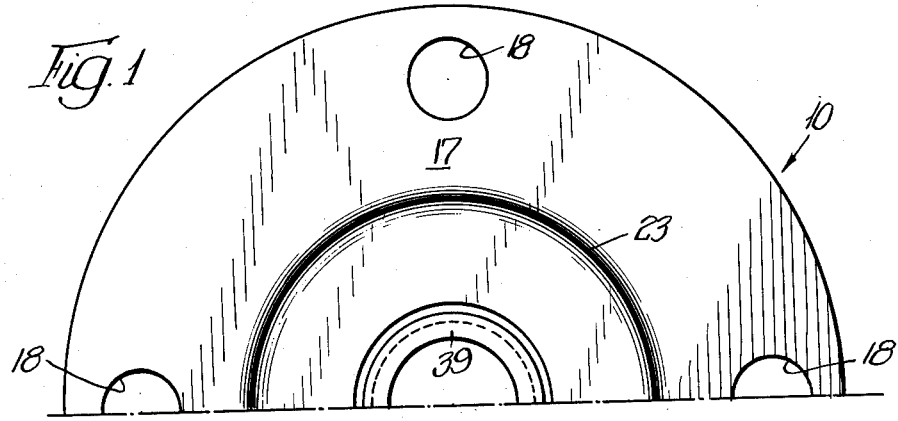
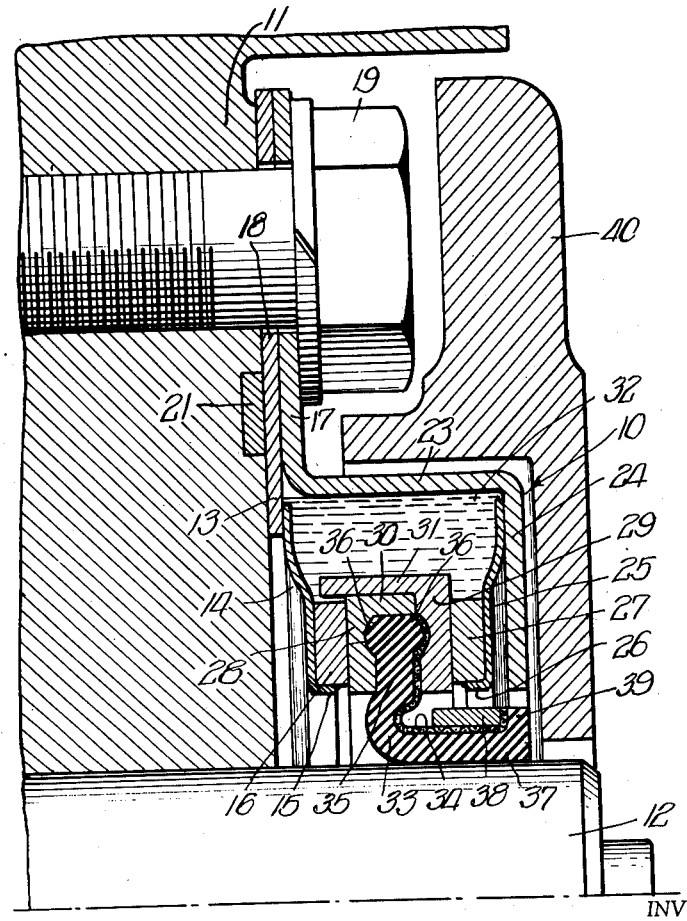
INVENTOR.
Edward A. Wheelock,
BY
Cromwell, Greist & Warden
ATTYS.

United States Patent Office 3,087,733
Patented Apr. 30, 1963

3,087,733
OIL AND DIRT SEAL
Edward A. Wheelock, Lake Zurich, Ill., assignor to Chicago Rawhide Manufacturing Company, Chicago, Ill., a corporation of Illinois
Filed Feb. 17, 1959, Ser. No. 793,743
8 Claims. (Cl. 277—39)

The present invention is directed to a new and improved form of a seal adapted for mounting between members, at least one of which rotates relative to the other. More specifically, the present invention is directed to a self-lubricating seal which includes a running end face sealing assembly provided with means placing and maintaining the same under constant load irrespective of axial relative and/or eccentric movement of the members on which the parts of the seal are mounted.

In running end face seal assemblies of the type now in common use, a standard design feature provides for the mounting of a sealing ring on a shaft, for example, and in end face sealing engagement with a mating ring mounted in the shaft housing. Either the mating ring or the sealing ring is urged by a suitable spring or the like into sealing engagement with the remaining ring and upon eccentric operation of or axial relative movement between the shaft and housing the pressure applied to the engaged end faces of the rings will vary. Such variation will reduce sealing efficiency in a number of applications.

Still further, in installations of the type described, it has been found desirable to provide self-contained lubrication to the engaged sealing faces. Seal designs incorporating this feature have often been rather complicated.

It is an object of the present invention to provide a new and improved seal for mounting between members, at least one of which rotates relative to the other.

A further object is to provide a new and improved constant load, end-thrust type seal which in addition to the constant load feature includes therein several other new and improved features, such as, self-lubrication and self-centering action.

Other objects not specifically set forth will become apparent from the following detailed description of the accompanying drawing wherein:

FIG. 1 illustrates the top half of the seal in end elevation; and

FIG. 2 illustrates the top half of a typical installation of the seal, this view being fragmentary and partly in section.

In the drawing, the seal 10 of the present invention is illustrated as including two main parts, one of which is designed for fixed mounting on a roller 11 and the other of which is designed for fixed mounting on a shaft 12. The installation of FIG. 2 is a typical track roller and is included in this application for purposes of describing operative functioning of the seal 10. While this seal is particularly adapted for track roller mounting for reasons to be described below, it will be understood that the seal is also useful in other suitable applications.

The seal 10 includes a first mounting ring 13 to the inner edge of which is secured the outer circumferential edge portion of a leaf spring ring 14. The inner portion of the spring ring 14 is provided with an axially directed flange 15 on which is seated and fixedly secured a sealing ring 16.

A second mounting ring is provided which has a radially directed portion 17 which is substantially co-extensive with the first mounting ring 13. The ring 13 and ring portion 17 are provided with circumferentially spaced, aligned openings 18 through which are receiver studs 19 which bolt the seal 10 to the rotating track roller 11. The roller 11 carries a gasket 21 sealing the engaging surface thereof with the ring 13. This is a standard track roller structure and operates in the well-known manner.

The ring portion 17 has integrally joined therewith an annular, axially extending portion 23 which is connected with an annular, radially inwardly directed portion 24. The upper inner surface of the portion 24 has fixedly attached thereto a second leaf spring ring 25, the inner edge of which is flanged at 26 and fixedly carries a second sealing ring 27.

Received between the inner surfaces of the sealing rings 16 and 27 is a mating ring assembly which includes two telescoped mating rings 28 and 29. Each of the mating rings 28 and 29 is of generally inverted L-shape having telescoped axially directed portions 30 and 31, respectively. The portion 31 substantially overextends the outer surface of the sealing ring 16 and the end of the portion 30 of the mating ring 28 abuts the inner face of the mating ring 29. The spring rings 14 and 25 are pretensioned to constantly urge the fixed sealing rings 16 and 27 inwardly toward one another and thus into end face sealing engagement with the opposite faces of the mating ring assembly. This arrangement provides for a running seal which operates in a manner to be described, the overextension of the axially extending portion 31 of the mating ring 29 which overlaps the sealing ring 16 functioning to retain the mating ring assembly in proper end face sealing alignment with the sealing rings 16 and 27 and further providing a self-centering function during the operation of the seal.

The combination of elements described defines a centrally located, enclosed annular area 32 in which lubricating material is received. The seal 10 is thuse provided with self-lubricating features as the lubricant carried in the enclosed area 32 is at all times in direct communication with the engaged end faces of the sealing and mating rings. Any suitable lubricant or lubricant supplying material may be received in the area 32.

The remaining part of the seal 10 is that which is fixed to the shaft 12. This part is, generally, in the form of a flexible diaphragm portion having an edge portion attached to the mating rings 28 and 29 with the opposite edge portion thereof attached to the shaft 12. This part is in the form of a rubber or a rubber-like member 33 which, preferably, has embedded therein or bonded thereto along the outer face thereof an abrasion resistant liner 34. This liner may be nylon fabric or any other suitable abrasion resistant material.

The member 33 is provided with a radially outwardly directed edge portion 35 which is preferably enlarged inwardly of its outer periphery to provide opposite face beads 36. These beads are received in grooves suitably formed in the adjacent faces of the mating rings 28 and 29 to increase friction drive of the mating rings and prevent dislodgement of the edge portion 35 from between the mating rings during operative use of the seal.

The central portion of the member 33 is of sufficient radial length and flexibility to accommodate axial and/or eccentric movement of the roller 11 relative to the fixed shaft 12. The member 33 further includes an axially directed sleeve portion 37 which is held in tight engagement with the shaft 12 by a clamping ring 38. The outermost edge portion of the axial sleeve 37 is provided with a radially directed rib 39 which retains the clamping ring 38 in place.

The improved operational features of the seal 10 include that of constant load on the running seal defined by the mating and sealing rings. The roller 11 rotates relative to the fixed shaft 12 and the flexible member 33 attached to the telescoped mating rings 28 and 29 remains stationary with the shaft and holds the mating rings against rotation with the track roller. Consequently, the sealing rings 16 and 27 rotate with the roller 11 and the spring rings 14 and 25 maintain constant load on the sealing rings and mating rings regardless of relative axial or radial movement between the roller and shaft. The central web portion of the member 33 accommodates axial and/or radial relative movement between the roller and shaft and no variation in load occurs in the running seal.

The track roller assembly is completed with a stationary track cap 40. As this cap is spaced from the shaft 12, abrasive material such as mud or dirt can enter along the shaft and into contact with the seal 10. To afford protection of the outer spring ring 25, the radially inwardly directed portion 24 of the mounting ring preferably extends downwardly co-extensively with the spring ring 25.

The structural features described permit variation and independent selection of material from which the inner and outer sets of rings are formed. This is of considerable importance in connection with obtaining maximum performance. By way of example, in minimizing corrosive damage to the seal 10 the elements of the seal exposed to foreign matter entering the assembly are preferably formed from corrosion-resistant materials. However, the innermost elements of the seal 10 which are not subjected to corrosive foreign matter need not be formed from the more expensive corrosion-resistant materials. This feature may be used to advantage in minimizing the overall cost of this seal 10 as, for example, the inner sealing ring 16 and mating ring 28 may be formed from less expensive materials.

Obviously certain modifications and variations of the invention as hereinbefore set forth may be made without parting from the spirit and scope thereof, and therefore only such limitations should be imposed as are indicated in the appended claims.

I claim:

1. A seal for mounting between members at least one of which rotates relative to the other, said seal comprising two parts, a first part for mounting on one of said members including a running seal assembly having a pair of spaced sealing rings fixed to said first part against rotation relative thereto and a mating ring received therebetween in outer end face running engagement therewith, means resiliently setting up an end face running seal between said mating ring and sealing rings, and a second part for mounting on the other said members including a diaphragm portion attached to said mating ring.

2. A seal for mounting between members at least one of which rotates relative to the other, said seal comprising two parts, a first part for mounting on one of said members including a running seal assembly having a pair of spaced sealing rings and a pair of telescoped mating rings received therebetween in outer end face running engagement therewith, said sealing rings being in resiliently held engagement with said mating rings, and a second part for mounting on the other of said members including a flexible diaphragm portion attached between said mating rings.

3. A seal for mounting between members at least one of which rotates relative to the other, said seal comprising two parts, a first part for mounting on one of said members including a running seal assembly having a pair of spaced sealing rings and a mating ring received therebetween in outer end face running engagement therewith, said sealing rings each being mounted on a spring metal plate which is pretensioned to resiliently hold the sealing ring in engagement with said mating ring, said plates forming a part of a housing for containing lubricant therein to lubricate said running seal, and a second part for mounting on the other of said members including a diaphragm portion attached to said mating ring.

4. A seal for mounting between members at least one of which rotates relative to the other, said seal comprising two parts, a first part for mounting on one of said members including a running seal assembly having a pair of spaced sealing rings and a pair of telescoped mating rings received therebetween in outer end face running engagement therewith, said sealing rings being in resiliently held engagement with said mating rings, said mating rings including means over lapping at least one of said sealing rings for self-centering relation thereto, and a second part for mounting on the other of said members including a diaphragm portion having an edge thereof received between said mating rings in clamped relation therebetween.

5. A seal for mounting between members at least one of which rotates relative to the other, said seal comprising two parts, a first part for mounting on one of said members including a running seal assembly having a pair of spaced sealing rings and a pair of telescoped mating rings received therebetween in outer end face running engagement therewith, said sealing rings each being mounted on a spring metal plate which is pretensioned to resiliently hold the sealing ring in engagement with said mating rings, said plates forming a part of a housing for containing lubricant to lubricate said running seal, said mating rings including means overlapping at least one of said sealing rings for self-centering relative thereto, and a second part for mounting on the other of said members including a diaphragm portion having an edge thereof clamped between said mating rings.

6. A seal for mounting between members at least one of which rotates relative to the other, said seal comprising two parts, a first part for mounting on one of said members including a running seal assembly having a pair of spaced sealing rings and a pair of telescoped mating rings received therebetween in outer end face running engagement therewith, at least one of said sealing rings being held in resilient engagement with said mating rings, and a second part for mounting on the other of said members, said second part being formed from rubber-like material having a radially directed edge portion clamped between said mating rings and an axially directed opposite edge portion for fixed mounting on the other of said members.

7. A seal for mounting between members at least one of which rotates relative to the other, said seal comprising two parts, a first part for mounting on one of said members including a running seal assembly having a pair of spaced sealing rings and a pair of telescoped mating rings received therebetween in outer end face running engagement therewith, at least one of said sealing rings being held in resilient engagement with said mating rings, and a second part for mounting on the other of said members, said second part being formed from rubber-like material having a radially directed edge portion clamped between said mating rings and an axially directed opposite edge portion for fixed mounting on the other of said members, one surface of said second part having bonded thereto and abrasion resistant liner.

8. A seal for mounting between members at least one of which rotates relative to the other, said seal comprising two parts, a first part for mounting on one of said members including a running seal assembly having a pair of spaced sealing rings and a pair of telescoped mating rings received therebetween in outer end face running engagement therewith, said sealing rings each being mounted on a spring metal plate which is pretensioned to resiliently hold the sealing ring in engagement with said mating rings, said plates forming a part of a housing for containing lubricant therein to lubricate said running seal, said mating rings including means overlapping at least one of said sealing rings for self-centering relative thereto, and a second part for mounting on the other of said members, said second part being formed from rubber-like material having a radially directed edge portion clamped between inner grooved faces of said mating rings and an axially directed opposite portion for fixed mounting on the other of said members.

References Cited in the file of this patent

UNITED STATES PATENTS

| | | |
|---|---|---|
| 2,000,341 | Larsh | May 7, 1935 |
| 2,322,834 | Dornhofer | June 29, 1943 |
| 2,420,040 | Frisby et al. | May 6, 1947 |
| 2,712,459 | Wahl | July 5, 1955 |
| 2,743,121 | Stevens | Apr. 24, 1956 |
| 2,881,014 | Amirault | Apr. 7, 1959 |